United States Patent Office 3,532,296
Patented Oct. 6, 1970

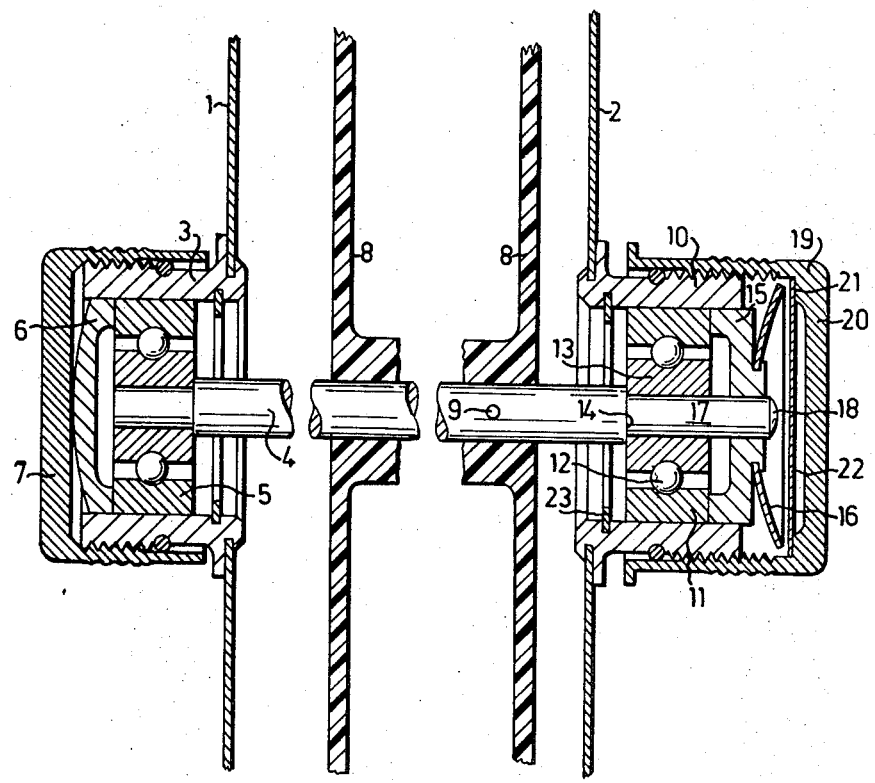

3,532,296
LINE SPOOL BRAKING DEVICE FOR FISHING
REELS
Åke Eugen Murvall, Svangsta, Sweden, assignor to ABU
Aktiebolag, Svangsta, Sweden, a corporation of Sweden
Filed Oct. 16, 1967, Ser. No. 675,562
Claims priority, application Sweden, Oct. 25, 1966,
14,640/66
Int. Cl. A01k 89/04
U.S. Cl. 242—84.5                                        3 Claims

ABSTRACT OF THE DISCLOSURE

A brake for a bait-casting fishing reel having a rotatable spool fixed to a spool shaft rotatably mounted at its opposite ends in ball bearings carried by the reel frame. A dual action spool brake is achieved by (1) initially adjusting a threaded cap to apply a relatively light braking action through a friction washer, resilient bent washer and axially slidable outer bearing race to the ball bearings, and (2) on further movement of the threaded cap to engage the friction washer directly against the spool shaft to apply a second, supplementary braking force.

---

The present invention relates to braking arrangements for fishing reels and is particularly concerned with a device for braking the spool of a fishing reel of the bait-casting type, comprising a spool shaft journalled in radial ball bearings and a device for adjustable braking of the spool shaft with the aid of a pressure member which may be adjusted in the direction of the spool shaft towards one end of the shaft from a zero or no-brake position to a position for maximum braking and conversely, the pressure member acting through a spring in an axial direction upon the axially movable bearing race of the adjacent bearing.

It has been proposed to meet the need of light braking of the spool when reeling out the line with the aid of a resilient friction brake member, which is pressed against the end face of the spool shaft with adjustable force. Such friction brakes have the disadvantage that the braking force decreases with increased rotational speed. Especially at the transition from static friction to kinetic friction the braking effect suddenly drops in connection with the strong acceleration of the spool at the beginning of the cast, when the spool also has the greatest line mass, this drop in braking force causes strong attenuation of the momentum of the bait at the beginning of the cast. The decreased braking force appearing when the acceleration of the spool has thus been attenuated may in unfavourable circumstances, such as when casting in a head wind or with a stiff line, cause the line to run out too quickly and become entangled.

It has also been proposed to achieve braking of the spool by subjecting the radial ball bearings, in which the spool shaft is journalled, to an adjustable axial load, whereby the specific pressure between the bearing balls and their races may be controlled. This has been accomplished by subjecting the non-rotating axially movable bearing race at one end of the spool shaft to an axial pressure, which has been transmitted through the balls and rotating bearing race and the spool shaft to the rotating bearing race and the bearing balls at the opposite shaft end and to the non-rotating and axially immovable bearing race cooperating therewith. Such ball bearing brakes may have a more suitable braking characteristic in that the braking force increases somewhat with increasing rotational speed, but are hampered by serious disadvantages. For a great increase of the axial lead of the bearings, only a small increase of the braking force is achieved. Using such a braking device, if one tries to load the bearings to such an extent as is required to achieve the braking effect necessary for the unfavourable conditions mentioned above, the axial load will be so great that the bearings are damaged through cracking of the balls and deformation of the bearing races.

An object of the present invention is to bring forth a device which makes it possible to eliminate the above mentioned disadvantages of both braking systems by effecting a progressive transition from pure bearing braking action to mainly frictional braking action when the braking force is increased.

The invention is characterized in that the spool shaft end face adjacent the pressure member 22 in the zero position of the pressure member 22 is located at a distance from the pressure member, said distance being less than the pressure member movement stroke.

When setting the pressure member from zero position to the position for maximum braking, the device accomplishes that at first the spring is tensioned with an accompanying increase in the axial loading of the bearings and the braking force thus provided by the bearings, but only to a certain limited value, which is reached when the frictional surface engages the end face of the spool shaft. From this moment on and with continued movement of the pressure member toward increased braking force, a frictional braking action will be added to the limited bearing braking action. As the movement of the pressure member is continued, this frictional braking force increases much more rapidly than the simultaneous increase of the bearing braking force.

Thus it is possible when using a thin line and when casting in favourable wind conditions to make use of the advantages of a very light and finely adjustable bearing braking action, which may be increased up to a certain limited value, and when using a heavier line or in more unfavourable wind conditions to increase the braking power by frictional braking action up to a substantially higher value than what is achievable with bearing braking alone, and this without overloading or damaging the bearings.

One embodiment of the invention is illustrated in the accompanying drawing, which shows an axial cross section through the bearing and braking device of the spool shaft, and in which drawing all parts not relevant to the invention, such as the mechanisms for spool driving, arresting and release, drag-braking and line-spreading have been left out.

In the drawing, the outer wall of one end wall assembly of the casting reel, which may contain the driving mechanism, is designated 1, whereas the outer wall of the opposite reel end wall assembly is designated 2. A hub 3 is connected to said wall 1, in which hub the spool shaft 4 is journalled in a manner known in the art with the aid of the radial ball bearing, the outer race 5 of which rests against an outer abutment 6, which is retained in position by a cap nut or clamping nut 7. A line spool 8 is fastened to shaft 4 with known means as at 9. A hub 10 similarly to the hub 3 of end wall 1 is connected to said end wall 2. This hub 10 has an inner cylindrical boring in which the outer race 11 of the correlated radial bearing 12 is guided for axial movement. Axial sliding movement of the race 11 places an increased frictional braking load on the ball bearings 12. In the inward direction towards the spool, the inner race 13 rests on a step 14 on spool shaft 4. The outer race 11 of this bearing rests, in the outward direction, on an annular face of a support member 15 which is movably guided in the hub and the outer face of which carries a spring in the shape of a washer resilient member 16 or bent into an arc. The end portion 17 of the spool shaft 4 extends through the inner bearing race 13 and through a boring in the support member 15 to project from this member with a smooth flat end face 18. A cap or clamping nut 19 is screwed onto the outside of hub 10 and with its bottom 20 covers a space enclosing the spring washer 16. A friction pressure member washer 22 rests peripherally on an annular step 21 on the inside of the bottom 20 of clamping nut 19. This frictional washer is preferably somewhat resilient. In the position of nut 19 shown on the drawing, in which position the frictional washer 22 just engages the edges of the spring washer 16 without compressing the same, and which position forms the zero or no braking position, the end face 18 of spool shaft 4 lies at a distance from the frictional washer 22 which is less than the axial distance between the frictional washer 22 and the suport member 15. A retaining ring 23 prevents the ball bearing from leaving the hub when the reel is disassembled. The opposite hub 3 is provided with a corresponding retaining ring.

When the nut 19 is tightened from the zero position shown on the drawing, the frictional washer 22 will engage the spool shaft end face 18 only when the spring washer 16 has been tensioned to such an extent that a limited axial load is transmitted in train to the ball bearing 12 and through the spool shaft 4 also to the ball bearing in the opposite reel end wall. If the nut 19 is tightened down past this engagement position between the end face 18 and the frictional washer 22, the latter is subjected to an increasing elastic deformation outwards with accompanying increased friction with the shaft end face 18, whereas the tension of the spring washer 16 is increased only negligibly. Although the pressure of the friction washer 22 against the shaft 4 has been transmitted directly to the ball bearing in the opposite reel end wall, this bearing is not subjected to any unallowable tension since the desired higher frictional resistance is achieved, due to the friction between end face 18 and friction washer 22, before a critical value for the tension in the bearings has been reached. Since the characteristic of braking force relative to rotational speed is rising for a bearing brake but falling for a frictional brake, the dissimilarities of these characteristics neutralize each other at least partly in the region of the adjustable braking force, where this is large, i.e., composed of both frictional resistance and rotational resistance in the loaded bearings. A braking force which is less dependent on the rotational speed is thus achieved over the larger part of the adjustable region.

In a surprisingly effective way the invention thus eliminates the above mentioned disadvantages of known pure frictional brakes and pure ball bearing brakes as such. By suitable choice of the spring characteristic of the spring washer 16 and the friction washer 22 and of that adjustment position of the nut in which the frictional surfaces 18 and 22 engage, it is possible to achieve any desired more progressive or steep transition from bearing braking action to combined bearing and frictional braking action. By a simple exchange of the spring washer 16 and the friction washer 22, it is thus possible to satisfy individual requirements within a very wide range.

What I claim is:

1. A device for braking the spool of a fishing reel of the bait-casting type comprising a spool shaft journaled in radial ball bearings, an axially slidable race engaging said bearings, said spool shaft having an end face, a friction pressure member movable from a non-braking position to a position to engage said end face to brake the rotation of said shaft, and a resilient member positioned in train between said pressure member and said movable race and engaged by said pressure member, said resilient member when urged by said pressure member axially moving said race to apply a braking friction in said radial bearing during an initial movement of said pressure member from said non-braking position, and said pressure member during further subsequent movement engaging said end face to said shaft to apply a further friction braking force, whereby a combination brake with reduced dependence on rotational speed is achieved.

2. A device substantially as set forth in claim 1 and further characterized in that said resilient member is formed in an arc and said arc is substantially resiliently straightened by the initial movement of said pressure member before said pressure member engages said end face of said shaft.

3. A device substantially as set forth in claim 1 further characterized in that said resilient member is formed as a bent washer and said pressure member engages and substantially flattens said washer during its initial movement prior to engaging said end face of said shaft.

References Cited
UNITED STATES PATENTS

| | | | |
|---|---|---|---|
| 2,486,027 | 10/1949 | Hirsch | 242—84.5 |
| 2,578,477 | 12/1951 | Hurd | 242—84.51 XR |

FOREIGN PATENTS

| | | |
|---|---|---|
| 122,592 | 8/1948 | Sweden. |

BILLY S. TAYLOR, Primary Examiner

U.S. Cl. X.R.

188—71

PO-1050
(5/69)

UNITED STATES PATENT OFFICE
CERTIFICATE OF CORRECTION

Patent No. 3,532,296    Dated October 6, 1970

Inventor(s) Ake Eugen Murvall

It is certified that error appears in the above-identified patent and that said Letters Patent are hereby corrected as shown below:

Column 2, line 70, cancel "washer resilient member 16 or" and substitute --resilient member or washer 16--.

SIGNED AND SEALED
DEC 8 1970

(SEAL)
Attest:

Edward M. Fletcher, Jr.
Attesting Officer

WILLIAM E. SCHUYLER, JR.
Commissioner of Patents